Feb. 25, 1964        F. M. HAGMANN ETAL        3,122,253
SEAL
Filed Oct. 10, 1960                     6 Sheets-Sheet 1

INVENTORS
FOSTER M. HAGMANN
HAZEN B. GRAHAM
ROBERT B. MORRIS
By Bulwinkel Mattingly & Huntley
Attorneys

INVENTORS
FOSTER M. HAGMANN
HAZEN B. GRAHAM
ROBERT B. MORRIS

Attorneys

Feb. 25, 1964  F. M. HAGMANN ETAL  3,122,253
SEAL
Filed Oct. 10, 1960  6 Sheets-Sheet 4

INVENTORS
FOSTER M. HAGMANN
HAZEN B. GRAHAM
ROBERT B. MORRIS
By Fulwider Mattingly & Huntley
Attorneys Feb. 25, 1964　　　F. M. HAGMANN ETAL　　　3,122,253
SEAL
Filed Oct. 10, 1960　　　　　　　　　　　　6 Sheets-Sheet 6

INVENTORS
FOSTER M. HAGMANN
HAZEN B. GRAHAM
ROBERT B. MORRIS
By Fulwider Mattingly & Huntley
Attorneys

United States Patent Office 3,122,253
Patented Feb. 25, 1964

3,122,253
SEAL
Foster M. Hagmann, 1001 3rd St., Santa Monica, Calif.;
Hazen B. Graham, 746 Cory Drive, Inglewood 3, Calif.;
and Robert B. Morris, 20616 Quedo Drive, Woodland
Hills, Calif.; said Graham and said Morris assignors of
seven and one-third percent to said Hagmann, and seven
percent to Wanda L. Pratt, Santa Monica, Calif.
Filed Oct. 10, 1960, Ser. No. 61,749
9 Claims. (Cl. 215—39)

This invention relates generally to seals and sealing devices. More particularly, this invention relates to self-sealing closures in the form of caps which can be economically manufactured for use on disposable containers, such as beverage bottles and jars, or the like.

This application is a continuation-in-part of my copending application, Serial No. 14,707, filed March 14, 1960.

There are in use a wide variety of seals. Sealing closures are used, for example, on such containers as bottles, jars, cans, etc. which are provided with cork, cardboard, rubber or other forms of sealing material. Such seals are of limited utility, particularly from the standpoint of initial hermetic or vacuum sealing and also from the standpoint of reusability. The inefficiency of the seal limits the shelf life of the product before initial opening and use and also the period of use of the product, since the container cannot effectively be resealed, once it has been opened.

While the disadvantages of conventional sealing closures have long been known, other types of seals have not been developed, because the cost of a precision fitted seal having an effective sealing design has been too great for use in mass produced articles, such as disposable containers.

Sealing devices of the O-ring type are well known for use in precision equipment and have many advantages. They will seal effectively under light sealing pressures, and will seal against either a high fluid pressure or a vacuum. In addition, they are fully reusable, non-contaminating and impervious to most all chemicals and substances. However, effective O-ring sealing is dependent upon having the correct volumetric relationship between the O-ring and the groove or confining void space and requires close tolerance fits, precision machining work, closely controlled inspection and testing, and other manufacturing techniques which are inherently expensive. Moreover, a loose O-ring as would be provided by the conventional O-ring and groove relationship, is not desirable in a container closure, particularly where the shelf life of an edible product in the container depends upon the effectiveness of at least the initial seal. For these reasons, it has not heretofore been thought that O-ring sealing could be successfully used in low cost mass produced container closures.

With the foregoing in mind, it is an object of this invention to provide a sealing closure which will seal effectively and which may be economically mass produced.

It is another object of this invention to provide an improved method and apparatus for applying a sealing closure.

It is a still further object of this invention to provide a method and apparatus for forming a sealing closure, wherein a resilient deformable sealing material is flowed into a groove in the retaining body of the closure so that all of the material is below the plane of a part contacting surface of the closure and wherein a wall of the groove is then deformed to force a central portion of the material above this plane so that the portion of material above the plane is volumetrically substantially equal to the void of the groove below the plane.

Another object of the invention is to provide a method and apparatus for forming and shaping a closure body around a sealing ring or strip molded into the body by utilizing the molded material to control the final shape and size of the body.

It is also an object of this invention to provide a sealing closure which may be adapted to various types of container closures or caps, and which undergoes sufficient physical deformation upon sealing engagement to overcome surface irregularity in the opposed face without danger of leakage.

Still another object of this invention is to provide a method and device for sealing a container wherein a retaining member groove is sized to a sealing member to achieve the optimum void-volume relationship during the container-capping operation.

A further object of this invention is to provide an inexpensive yet efficient sealing closure which incorporates an integral sealing member-liner element.

Other objects, features, and advantages of the present invention will be more fully apparent to those skilled in the art from the following detailed description taken in connection with the accompanying drawings in which like reference characters refer to like parts throughout and wherein.

Figure 1:
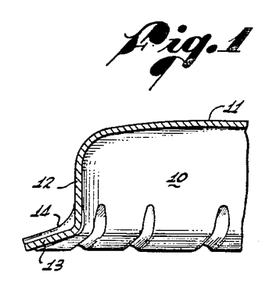
FIGURE 1 is a central elevational sectional view, partly broken away, of a crown-type bottle cap.
Figure 2:
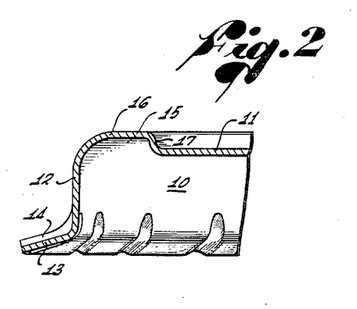
FIGURE 2 is a view similar to FIGURE 1, showing the cap after the first step in forming a groove therein.
Figure 3:
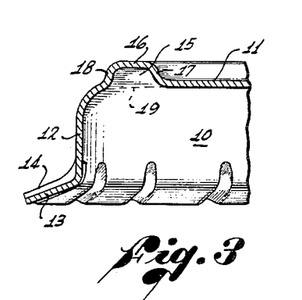
FIGURE 3 is a view similar to FIGURE 1, showing the cap after the second step has completed the groove which is ready to accept sealing material.

Turning now to the drawings, there is shown in FIGURES 1, 2, and 3 a series of partial cross sections of a typical crown-type bottle cap at various stages of its preliminary shaping for use in the present invention. In FIGURE 1, the cap 10 is shown having a central substantially circular crown-shaped portion 11 having an integral downturned flange 12 thereon. The bottom edge 13 of the flange 12 flares outwardly and is serrated in the usual manner, as by a plurality of ridges 14 stamped therein. The cap 10 is stamped or punched from a thin sheet of workable metal, such as thin coated steel or the like.

Caps of the type shown in FIGURE 1 are, of course known in the art and are readily available on the open commercial market or can be punched or stamped from sheet metal in any convenient conventional manner. In accordance with the present invention, an annular groove 15 is next stamped around the periphery of the upper central portion 11 of the cap. Conveniently, the groove 15 may be formed in two stamping operations from the blank shown in FIGURE 1. The first operation produces a cross section of the type shown in FIGURE 2. It will be noted that the central portion 11 has been stamped or urged downwardly from its peripheral portion 16 to which it is connected by a portion 17 which ultimately forms a side wall of the groove 15. The peripheral portion 16 of the cap forms the bottom wall of the groove 15.

It will be understood that the wall 16 is referred to as the "bottom wall" of the groove 15, even though it is shown at the top or uppermost part of the drawing as the cap is positioned therein. The wall 16 is considered to be the "bottom" since the groove 15 is deemed to be recessed downwardly from part engaging surface 11. Nothing more than a matter of terminology is involved and for our present purpose it is convenient to define the wall 16 to be the bottom wall of groove 15 in any position in which the cap 10 may be held.

The forming of the groove 15 is completed by the step illustrated in FIGURE 3, wherein the junction of the downwardly extending flange 12 and the peripheral portion 16 is stamped inwardly to form a shoulder portion 18 which serves as the outer side wall of the groove 15.

The stamping operations necessary to shape the cap from the configuration shown in FIGURE 1 to that shown in FIGURE 3 can be carried out on any conventional apparatus well known in the art. It should be pointed out, however, that most such apparatus will function satisfactorily only within reasonable tolerance ranges and that it is, therefore, not economically feasible to specify the volume of the groove 15 with any really high degree of precision. The present invention is adapted to accept crown cap blanks stamped in the configuration illustrated in FIGURE 3 having the volume of the groove 15 specified only to within a reasonably large tolerance range, since correction for deviation from the desired value is provided for in a manner to be described below. The volume of the groove 15 in FIGURE 3 may be defined as the volume enclosed within bottom wall 16, side wall 17, side wall 18, and the plane indicated by the dashed line 19.

The dashed line 19 in FIGURE 3 indicates the plane of the part engaging surface of the cap, which is also the plane of the top of the groove. That is to say, the lower surface of the central portion 11 of the cap when projected on across the groove 15 will merge with the bottom of the shoulder 18 and the inner edge of the downturned flange 12 to form the plane which is adapted to seat on the top of the bottle or other container to be sealed or closed by the cap or closure member 10.

Figure 4:
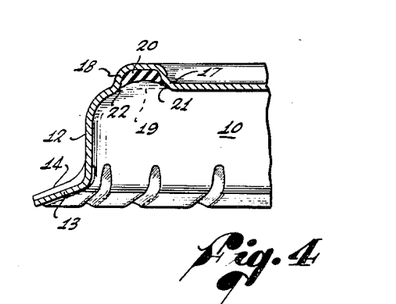
FIGURE 4 is a view similar to FIGURE 3 and showing the cap and the sealing material which has been poured into the groove.

The next step in forming the sealing closure in accordance with the present invention is illustrated in FIGURE 4 which shows a partial section of the crown-type bottle cap having a plastisol sealing ring 20 installed and cured in the groove 15. Although it is preferred to use a plastisol which can be flowed or poured in liquid form into the groove 15 when the cap is inverted from the position shown in FIGURES 3 and 4, it will, of course, be understood that any suitable substantially incompressible resilient deformable sealing material can be used. The liquid plastics of the type which can be poured and molded directly in the groove 15 are particularly suitable for use herein. In particular, it will be noted from FIGURE 4 that the viscosity of the liquid plastisol is such that it is attracted to the walls of the groove 15 at the edges of the surface of the plastisol. It will further be noted that the junction of the surface of the plastisol with the walls 17 and 18 of the groove 15, that is, the junction points 21 and 22, as shown in FIGURE 4, lie below the plane 19 of the part engaging surface of the cap. The term below is used here since, as noted above, the wall 16 of groove 15 is considered the bottom of the groove. Furthermore, the entire surface area and volume of the plastisol seal 20 lies below the plane 19 by virtue of the above noted viscosity of the liquid being such as to attract the plastisol to the side walls 17 and 18.

Normally, it is intended that the volume of the plastisol sealing material 20 shall be such as to occupy slightly more than half of the volume of the groove 15. However, in accordance with the present method, economy of manufacture is facilitated in that provision is made to tolerate considerable variation from the normal desired amount shown in FIGURE 4. The manner in which variations from this amount are compensated for, will be described in detail below. At this point, however, it should be pointed out that the showing in FIGURE 4 represents substantially what is considered an average amount of plastisol intended to be placed in the grove 15. As noted above, this material is flowed into the groove and molded and cured therein. This flowing operation can be performed in any convenient conventional manner either by automatic apparatus or by hand pouring. No particularly precise or close control over the exact amount of material poured into the groove is required.

The final shaping step in the manufacture of the sealing device is such as to automatically compensate for or correct tolerance variations either in the initial volume of the groove 15 or in the volume of plastisol or other sealing material 20 poured into the groove. This final shaping step may, for example, be carried out on apparatus of the type shown in FIGURE 5.

Figure 5:
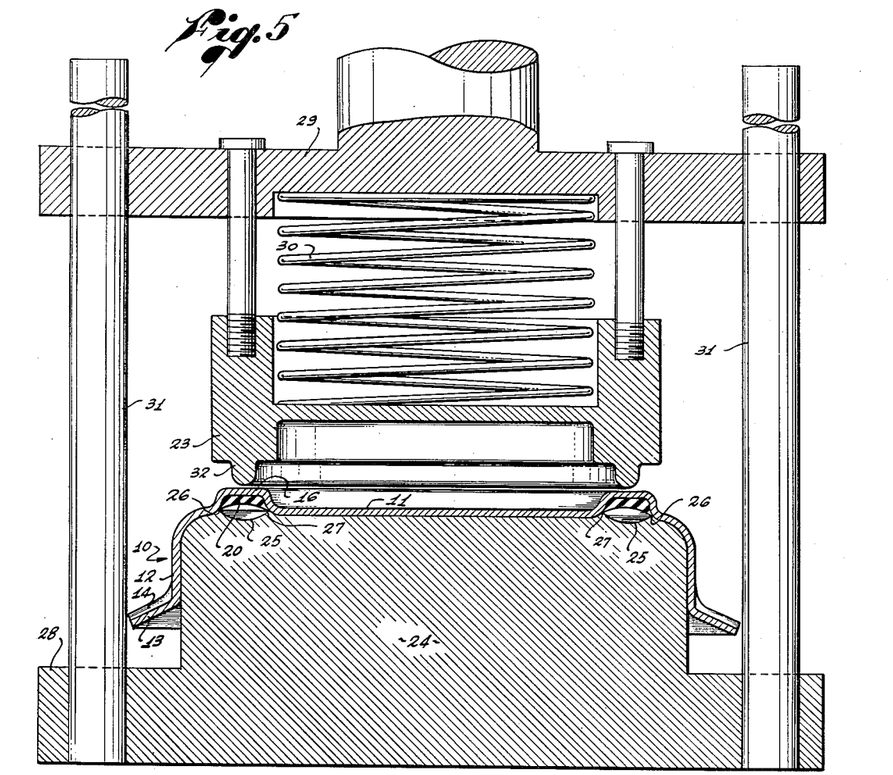
FIGURE 5 is a diagrammatic view of a punch and die arrangement in a press for further shaping the seal to the desired void-volume relationship.

In FIGURE 5, there is shown somewhat diagrammatically a conventional stamping press provided with a spring loaded punch 23 and a die 24. The die has a preformed cavity 25 between high points 26 and 27, respectively, which cooperate with the cavity 25 to create an optimum void-volume ratio by the operation of the press on the cap. As may be seen in FIGURE 5, the die 24 is securely positioned on any conventional supporting base plate 28 and then the cap blank 10 in the state in which it is shown in FIGURE 4 is positioned on the die 24. The punch 23 is connected in depending relationship to the movably mounted press member 29 by a spring 30. Any conventional power actuated means may be provided to move the press 29 carrying the spring loaded punch 30 up and down in a vertical direction on the support members 31.

Figure 6:
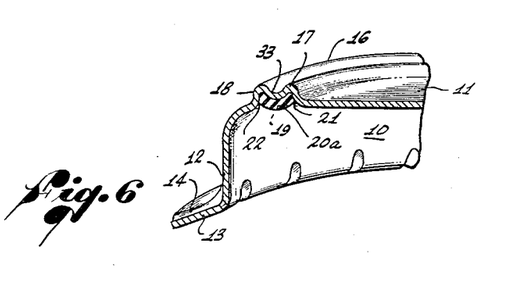
FIGURE 6 is a perspective view, partly broken away, showing a completed cap and seal, where the normal amount of sealing material has been used.

The punch 23 has an annular depending tip member 32, the lower surface of which is semi-toroidal in shape and which is positioned to register with the bottom wall 16 of groove 15 when the punch descends. The tip 32 deforms the top wall 16 of the groove 15 to form the indentation 33 shown, for example, in FIGURE 6. In FIGURE 6, it will be noted that the crown-type bottle cap 10 with the plastisol or other sealing material 20 molded in the groove 15 has been deformed by the indentation at 33 so as to create the proper void-volume relationship between the groove and the sealing material. It will be noted that the points 21 and 22 have been held in the same position relative to the side walls 17 and 18 as was occupied by these points at the stage of manufacture shown in FIGURE 4, wherein the groove 15 had not been deformed by the punch. The action of the punch in deforming the groove 15 by shaping the indentation 33 in the surface 16 thereof, however, urges the central portion of the sealing material 20 out of the groove and above the plane of the part engaging surface of the cap which is indicated in the drawings by the dashed line 19.

In particular, it will be noted that there is a portion 20a of the material 20 shown in FIGURE 6, which projects above or inwardly from the plane of the part engaging surface 19 so that the portion 20a of the sealing material would contact the surface on which the cap is positioned before this surface is contacted by the lower surface of the portion 11 and side 12 of the cap. This portion 20a is, however, of a volume which is at most equal to and preferably slightly less than the volume of the void left in groove 15 on the inner side of line 19. Because of this equal volumetric relationship between the projecting sealing material and the void in the groove, the deformable sealing material can all be accommodated within the groove 15 when the cap is placed on the bottle or other container, as will be described in greater detail below. It has been found that this equal volumetric relationship using an essentially incompressible, but resilient and deformable sealing material, leads to a highly effective and efficient seal. It is one of the purposes of the present invention to insure this relationship in spite of manufacturing tolerances in the size of the groove 15 and the amount of sealing material 20 originally deposited therein.

Figure 7A:
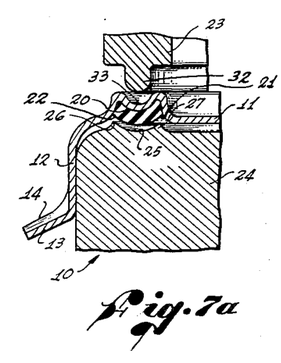
FIGURE 7a is a diagrammatic elevational sectional view, partly broken away, showing the relationship of the structure of FIGURE 6 to the punch and die of the apparatus in FIGURE 5.
Figure 7B:
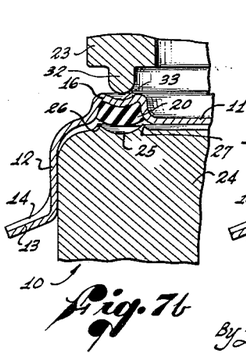
FIGURE 7b is a view similar to FIGURE 7a illustrating how the desired volume-void relationship is maintained by the action of the punch and die, when more than a normal amount of plastic material has been poured into the groove.
Figure 7C:
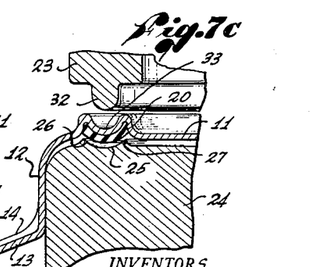
FIGURE 7c is a view similar to FIGURE 7a, but illustrating the same effect, when less than the normal amount of sealing material has been poured into the groove.

The manner in which this equal void-volume relationship is achieved, in spite of varying tolerance conditions, may best be seen from a consideration of FIGURES 7a, 7b, and 7c. FIGURE 7a is a partial section of the crown-type bottle cap 10 with the normal amount of plastisol 20 deposited in the normal size groove therein. The figure shows the sizing punch 23 and the die 24 partially disengaged. FIGURE 7b is similar to FIGURE 7a, but shows the same situation where more than the normal amount of plastisol or other sealing material has been deposited in the groove 15. FIGURE 7c is again similar to FIGURE 7a, but shows the situation when less than the normal amount of plastisol has been deposited in the groove 15. Of course, it will be understood that although the drawings illustrate a variation in the amount of sealing material, similar considerations will apply to variations in the size of the groove. Thus, depositing too much material in a normal size groove, as in FIGURE 7b, is the same in principle as depositing the normal amount of material in a groove which is too small. Conversely, depositing too little material in a normal size groove, as in FIGURE 7c, is the same as depositing the normal amount of material in a groove which is too large.

In operation, the spring loaded punch 23 co-acts with the die 24 having the preformed cavity 25 and high points 26 and 27 thereon to secure the optimum void-volume ratio by insuring that the inner surface of the cap member 10 has the desired configuration determined by conformity to the configuration of the outer surface of the die 24. Thus, in operation, the spring loaded punch descends, deforming or indenting the top 16 of the groove 15 to form the indentation 33 and thereby pushing the plastisol 20 ahead of it until the cavity 25 in the upper surface of the die is fully occupied. The press member 29 shown in FIGURE 5 continues the full extent of its travel which travel is greater than is normally required to be executed by the punch 23 in order to fill the cavity 25. The extra travel of punch press member 29 is accommodated by compression of the spring 30. Of course, it will be understood that the spring 30 is such that a slightly greater force is required to compress it than is required to deform the cap member 10 so that the spring 30 is not compressed until the punch 23 is resisted not only by the cap member 10 and plastisol 20, but also by the seating of the plastisol on the die 24. Thus, although the press continues to the extreme of its travel, the spring loaded punch will have no further effect on the plastisol 20.

The operation of the press in the situation illustrated in FIGURE 7b is essentially the same in principle. The difference, of course, is that the spring loaded punch does not have to descend as far as in FIGURE 7a before its travel is stopped by the resistance of the die 24. Again, the excess travel of the press 29 (which here is greater than in FIGURE 7a) is taken up by compression of the spring 30. Thus, the only difference in the action of the press in the situations illustrated in FIGURES 7a and 7b is that the indentations 33 formed in the top surface 16 of the groove by the punch 25 is not as great in FIGURE 7b as it is in FIGURE 7a. The travel of the press 29 is exactly the same and the difference in travel of the punch 23 is taken up by the spring 30. Furthermore, the inner surface of the cap 10 has the same configuration conforming to the outer surface of the die 24 in both FIGURES 7a and 7b so that in both instances the same desired void-volume relationship is automatically achieved.

Similar considerations, of course, apply to the situation illustrated in FIGURE 7c except that in this instance the punch 23 has a longer path of travel than in the normal case illustrated in FIGURE 7a in order to compensate for the deficiency in the volume of the sealing material 20 by making the indentation 33 deeper in the groove 15 and thereby urging the sealing material into complete contact with the surface of cavity 25 in die 24. Again, the desired equal volumetric void-volume relationship is automatically achieved.

The cap or closure device which is sold as an article of manufacture resulting from the process of manufacture illustrated in FIGURES 7a, 7b, and 7c, is shown in the broken away perspective view of FIGURE 6. It will be noted that the deformation or indentation 33 which has been formed in the groove 15 of the cap 10, is of a depth and in a direction, such as to cause a portion 20a of the sealing material 20 to be urged or to project upwardly from the bottom of the groove beyond the plane of the part engaging surface indicated by the dashed line 19. The volume of this protruding portion 20a of sealing material is equal to or slightly less than the volume of the void spaces left in the groove adjacent points 21 and 22 on either side of the groove which have not been moved.

It will be understood that throughout the specification the word indent or indentation is used to mean any deformation of any portion of any wall of the groove, such as to urge the sealing material molded into the groove to be displaced outwardly from the groove. It is apparent that other shapes or types of deformations or indentations differing from that shown specifically at 33 in the drawings could be used to achieve the same desired equal volumetric void-volume relationship.

The cap as shown in FIGURE 6, is intended to be applied to the top of a bottle or other container in the standard manner, using the conventional bottle capping press equipment. The capping process is illustrated in FIGURES 8a, 8b, and 8c at three different stages of operation of the press as it seals the cap 10 onto the top of a bottle 40.

The conventional bottle capping press includes a pressure foot 41 and a crown block 42 which are adapted to be seated downwardly on the top of the bottle and are mounted for vertical motion with respect to each other, as well as with respect to the top of the bottle. As will be noted, the outer diameter of the pressure foot 41 is essentially equal to the outer diameter of the largest part of the top lip of the bottle, whereas the inner diameter of the crown block 42 (which is mounted concentrically with the pressure foot 41) is substantially equal to the outer diameter of the depending flange 12 of the cap 10 when this flange is seated in sealed relationship to the upper lip 43 of the bottle 40. The lower end of the crown block 42 is flared or tapered outwardly as at 44 to accommodate the outwardly flared bottom edge 13 of the flange 12 of cap 10.

Figure 8A:
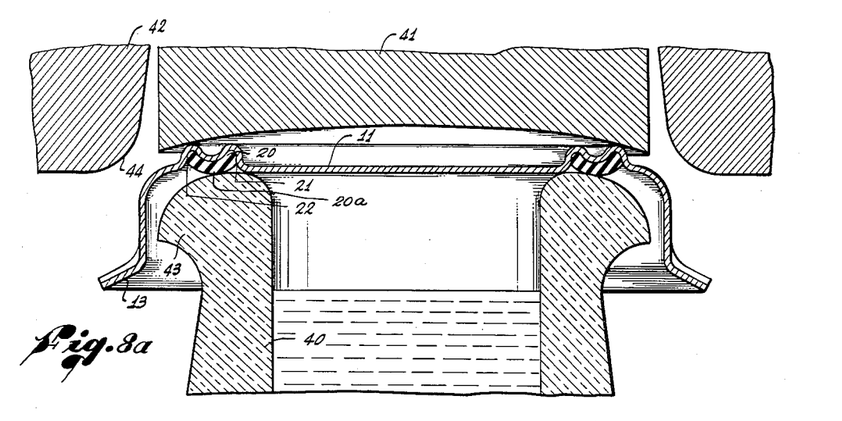
FIGURES 8a, 8b, and 8c are diagrammatic sectional views illustrating the progressive phases of the process of sealing the cap on a bottle.

In FIGURE 8a it will be noted that the crown-type bottle seal is installed on the bottle 40 with the pressure foot 41 in contact with the cap 10. It is seen that both the protruding portion 20a of the seal 20 and the lower surface of the central portion 11 of the cap 10 are in contact with the lip 43 of the bottle 40. The position of the part shown in FIGURE 8a is, of course, the first stage in the capping operation.

Figure 8B:
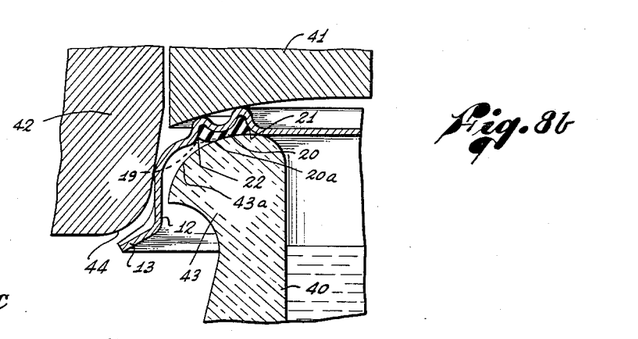
Figure 8C:
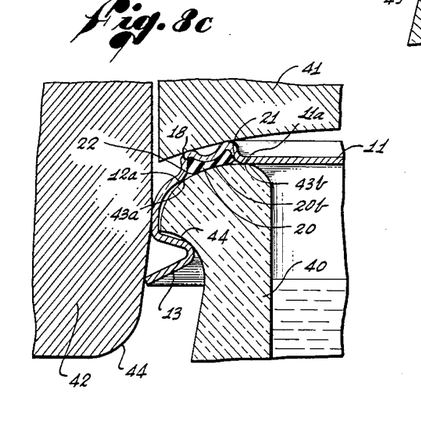

The second stage of this operation is shown in FIGURE 8b, where it will be noted that the crown block 42 has partially descended around the outer flange 12 of the cap 10. It will be seen that the small radii of the groove resist deformation and that the radius adjacent to point 21 acts as a fulcrum. That is to say, the upper portion of the cap pivots about point 21 as a fulcrum, as the crown block descends and urges the flange 12 inwardly. It should be noted in FIGURE 8b that the points 21 and 22, where the sealing material 20 contacts the side walls of the groove 15, have not changed their position relative to the side walls of the groove. A portion of the protruding sealing material 20a has, however, been urged back into the groove, thereby reducing the volume of the void left in the groove below the line 19. Of course, the pivoting about point 21 also bends the "plane" of the part engaging member 11 to begin to conform with the curved upper surface 43a of the lip 43 of the bottle.

In FIGURE 8c, there is shown a partial cross section of the completed crown-type bottle cap 10 at the moment capping is completed. It will be noted that the radius adjacent to point 22 has now contacted the upper lip 43a of the bottle, thereby confining the plastic sealing material in the groove 15. That is to say, the lower surface of the central part engaging portion 11 contacts the upper inner edge of the bottle at the inner wall 17 of groove 15; and the upper inner surface 12a of the flange (where this flange merges with the side wall 18 of the groove 15) contacts the upper portion 43a of the lip 43 of the bottle 40. Of course, the surface projection represented by the dashed line 19 has, therefore, now been bent around the point 21 as a fulcrum so that this surface projection 19 now conforms exactly with the top surface of the lip 43 of the bottle 40.

It will be noted in FIGURE 8c that immediately adjacent to the points 21 and 22 and above the top of the lip 43 of the bottle, there remains two areas which are not entirely filled by the deformed sealing material. This void remaining within the groove in the fully sealed condition, represents the residual tolerances which do not in any way impair the effectiveness or efficiency of the sealing arrangement. That is to say, the above discussed relationship between the volume of the sealing material 20a which is originally protruding beyond the line 19 and the volume of the void space in the groove 15 in back of the line 19 into which the protruding material is deformed in the sealing operation, will be understood to be one of substantial or approximate equality. The tolerance in this respect should be on the low side with respect to the volume of protruding material. That is to say, the volume of the protruding material should not exceed the volume of the void left in the groove and should be substantially equal to the volume of the void. However, if as shown in FIGURE 8c, the volume of the protruding material is not quite equal to the volume of the void, an effective seal can still be obtained. The lower limit in this respect is set by the fact that there should be sufficient sealing material protruding out of the groove before the capping operation, so that the deformation of the sealing material will exert sufficient force on the top of the lip of the bottle to give good tight sealing action.

It will be noted from FIGURE 8c that a metal to glass contact is made by the cap on the bottle at the point 11a where the under surface of the central part engaging portion 11 contacts the lip of the bottle at point 43b and at the point 12a, where the upper inner edge of the downwardly extending flange 12 contacts the point 43a on the outer edge of the lip 43 of the bottle 40. Between these two points which are in fact, of course, annular line contacts extending around the lip, the sealing material 20 has a broad area contact 20b with the lip of the bottle which area contact is maintained under sealing pressure by the deformation of the sealing material 20. Of course, the cap 10 is held in position on the top of the bottle and the above noted sealing pressure is thereby maintained by the deformation of the lower portion of the flange 12 and the outwardly flaring portion 13 to seat under the shoulder 44 at the lower edge of the lip 43 of the top of bottle 40. This manner of locking the cap in position is the usual conventional and well known method. It serves, however, to cooperate with and make possible the novel sealing device and method of the present invention.

A modified form of the cap and sealing method discussed in detail above is illustrated in FIGURES 9 and 10a through 10c, and is described below. This form and method have the independent advantage of the cap being sized to obtain the optimum void-volume relationship during the capping operation.

A cap blank, as shown in FIGURE 1, is stamped to form a cap 50, illustrated in the last-mentioned figures. The stamping operation is not described in detail in connection with the present embodiment, it being understood that it is similar to that previously described.

Figure 10A:
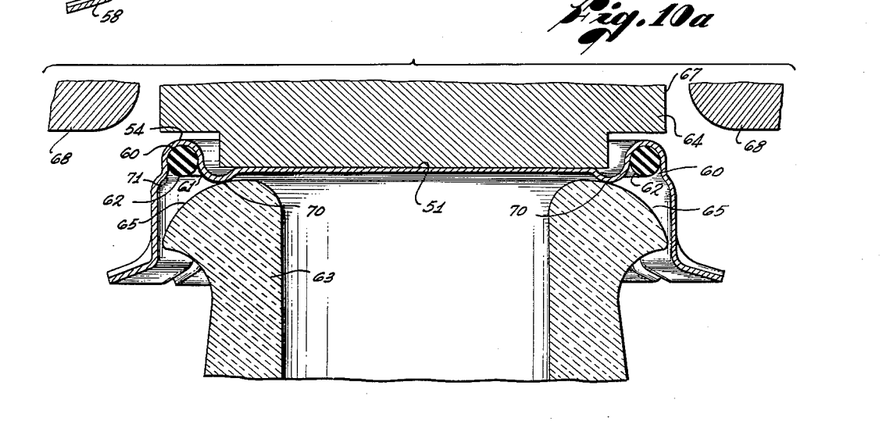
FIGURES 10a, 10b, and 10c are sectional views illustrating successive stages of the operation of applying the cap and sealing member shown in FIGURE 9 to a bottle.

For convenience of description, the cap 50 is assumed to be an orientation as in FIGURE 10a, the terms used, such as "upper" and lower" being meaningful only when it is so oriented.

The cap 50 is circular in overall shape and includes generally a central closure portion 51, a peripheral groove portion 54 defining a seal-receiving groove 60 and a downwardly depending flange or skirt 57. Annular, downwardly facing pressure ridges 70 and 71 are provided at the inner and outer extremities, respectively, of the groove 60 and are adapted to function in the capping operation in a manner which will later be explained in detail.

The inner pressure ridge 70 is preferably formed by depression in the central portion 51 of the cap, though in a broader sense it may be considered as merely a lowermost surface adjacent the groove opening. Somewhat similarly, the outer pressure ridge 71 is formed at the junction of the outer groove wall and the skirt 57. The marginal portion 58 of the skirt 57 flares outwardly and is serrated as at 59.

The volume (cross-sectional area as viewed in the drawings) of the groove 60 is defined as the space enclosed above the plane of the dashed line 61. It will be seen that the line 61 is an extension of the plane of the lower surface of the central portion 51 of the cap. As will hereinafter be explained in detail, it is neither feasible nor necessary to hold the manufacture of the cap within a close tolerance range, as relatively large deviations in the size and shape of the groove 60, for instance, can be compensated during the capping operation.

A continuous sealing member or ring 62 formed of a resilient, deformable and substantially incompressible plastic or the like is receivable in the groove 60. For optimum sealing, the lower sector of the ring 62 has an arcuate periphery, and for convenience of manufacture, the ring is here shown as toroidal in overall shape. As may be seen in FIGURES 9 and 10a, the volume of the ring 62 is initially somewhat less than that of the groove 60.

As previously mentioned, relatively large deviations in size and shape of the groove 60 from the standard can be compensated during the capping operation. Likewise, as will be explained, deviations in the size and shape of the sealing ring 62 from the standard can also be compensated during the capping operation. Thus, it is not necessary to hold the manufacture of the cap 50 or the sealing ring 62 within a close tolerance range.

Figure 9:
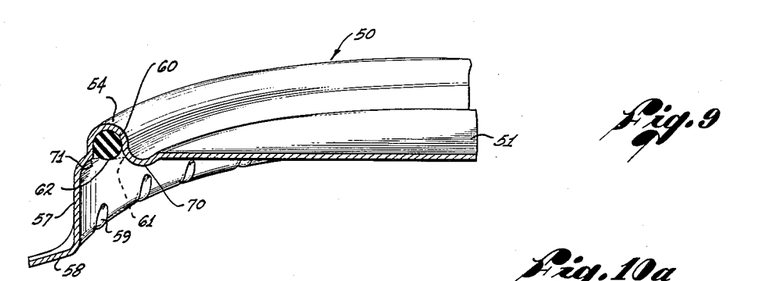
FIGURE 9 is a fragmentary perspective view of a modified form of cap and sealing member.

The cap 50 fitted with sealing ring 62, as illustrated in FIGURE 9 and described above, is adapted to be applied to a standard bottle 63 in a manner similar to that described in connection with the previous embodiment. The capping process is schematically shown at successive stages of progress in FIGURES 10a, 10b, and 10c.

In this case, a pressure foot 64 of the capping press has an outside diameter in its cap engaging portion at least equal to the diameter of the inner pressure ridge 70. In the illustrative embodiment, the pressure foot 64 has an enlarged upper portion 67 adapted to function as a guide for a concentrically mounted crown block 68, which, in turn, is reciprocable relative thereto. The lower end of the crown block 68 is flared or tapered outwardly as at 69 to accommodate the outwardly flared marginal portion 58 of the skirt 57.

In the initial step of the capping operation, as illustrated in FIGURE 10a, the cap 50 is placed over the lip 65 of the bottle 63 and the pressure foot 64 is lowered into engagement with its central portion 51. When the pressure foot 64 is so engaged, the annular ridge 70 is pressurally engaged against the bottle lip 65.

Figure 10B:
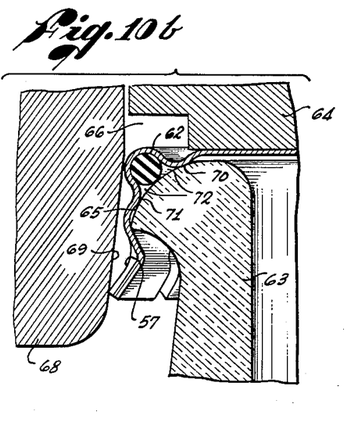

The second stage of the capping operation is shown in FIGURE 10b. In this stage the crown block 68 engages the skirt 57 of the cap and partially descends around the stationary pressure foot 64 and bottle lip 65. The ridge 70 acts as a fulcrum for that portion of the cap 50 outwardly of the ridge. That is, as the crown block 68 descends and urges the skirt 57 inwardly, the above-specified outer portion of the cap 50 pivots about the ridge 70 as a fulcrum. Such pivoting takes place until the outer pressure ridge 71 pressurally engages the lip 65 of the bottle. Substantially coincidentally with the contacting of the outer ridge 71 with the bottle lip 65, the sealing ring 62 also contacts the lip 65 as may be seen in FIGURE 10b. It will be appreciated that the cooperating ridges 70 and 71 have relatively small areas of contact and hence relatively high unit contact pressures. Because of this pressural contact, the ridges 70 and 71 provide some sealing and, more important, they form dams for confining the deformable sealing ring 62 within the groove 60. It will be noted that considerable void space 72 remains in the groove 60 at this stage of the operation.

Figure 10C:
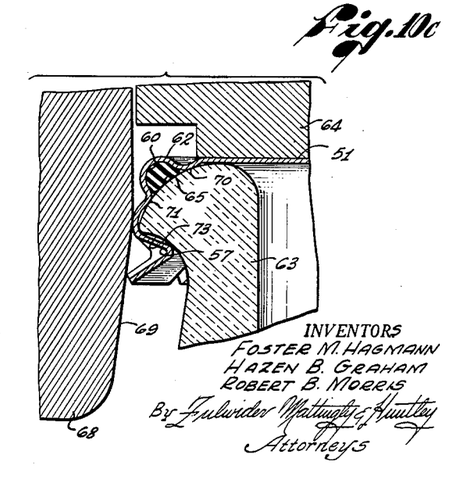

The cap 50 and the elements of the capping press are shown at the completion of the capping operation in FIGURE 10c. In the final stage the pressure foot 64 further descends to flatten the central portion 51 of the cap 50 against the lip 65. It will be noted that the crown block 68 has further descended from its position of FIGURE 10b. As such action takes place, the outer ridge 71 is pulled slidably down the surface of the lip 65 to reduce the volume of the groove 60, thereby deforming the lower arcuate section of the sealing ring 62 against the lip.

This reduction of groove volume and sealing ring deformation continues during the final stage of the capping operation until the optimum void-volume relationship is established. As previously discussed, the optimum relationship is when the volume of the sealing ring 62 is equal to that of the groove 60, i.e., there is no void space remaining.

When the ridge 71 is pulled down sufficiently to establish an equal void-volume relationship, the crown block 68 wipes or slides over the skirt 57 and crimps it inwardly against an annular shoulder 73 at the lower edge of the lip 65 to lock the cap on the bottle and maintain sealing pressure.

Variations from the standard in either the volume of the groove 60 or the sealing ring 62 are compensated by either more or less of the skirt 57 being pulled down below the lip 65 and crimped inwardly against the annular shoulder 73 at the lower edge of the lip.

In a situation where the sealing ring 62 is undersize or the groove 60 is oversize a greater extent than usual of the skirt 57 is pulled down over the lip 65. Conversely, where the sealing ring 62 is oversize or the groove 60 is undersize the extent of the skirt 57 pulled down is, of course, less than normal.

The important consideration in both of the above situations is that the optimum void-volume relationship is still established in spite of the deviations. Thus, it will be appreciated that there is provided an inexpensive yet efficient cap and sealing method wherein groove sizing to achieve the optimum void-volume relationship takes place during the capping operation.

Another modification of the cap and method of the invention is illustrated in FIGURES 11 and 12a through 12d. The instant cap and method are closely related to that just previously described in that sizing to achieve the optimum void-volume relationship takes place during the capping operation. The instant embodiment differs from the previous one for the reason that an integral sealing member-liner element 80 is used in place of the separate sealing ring 62 previously described. Because of the particularities of such an integral element 80, a cap 81 is necessarily formed with a slightly different configuration than that of cap 50.

Figure 11:
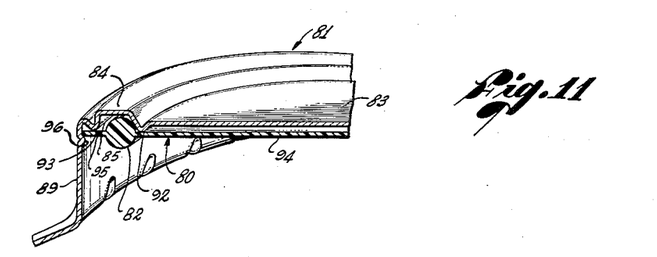
FIGURE 11 is a fragmentary perspective view of another modified form of cap mounting an integral sealing member-liner element.

Referring to FIGURE 11, the cap 81 includes generally a central closure portion 83, a peripheral groove portion 84 defining a seal-receiving groove 85, and a downwardly turned skirt 89. Concentric inner and outer pressure ridges 92 and 93, respectively, are provided adjacent to and on opposite sides of the groove 85.

The integral sealing member-liner element 80 is constructed so that a sealing ring 82, similar to the previously described ring 62, has its central space closed by a liner disc 94. The disc 94 serves as a noncorrosive liner for the cap 50. A peripheral liner flange 95, having an outside diameter substantially equal to the inside diameter of the skirt 89 adjacent the outer pressure ridge 93, extends outwardly from the ring 82. It will be noted that the thicknesses of the disc 94 and flange 95 are relatively small as compared to the cross-sectional diameter of the ring 82.

It is desirable to retain the element 80 in assembly with the cap 81 even prior to installation on the bottle 63. To this end, the skirt 89 is formed with a series of angularly spaced and inwardly projecting dimples or detents 96. The element 80 is fitted in the cap 81, as shown in FIGURES 11 and 12a, by springing the liner flange 95 over detents 96 whereupon it is retained between the outer pressure ridge 93 and the detents.

The cap 81 retaining the element 80 in the manner described above is adapted to be applied to the bottle 63 in the manner shown schematically in FIGURES 12a, 12b, 12c, and 12d.

Figure 12A:
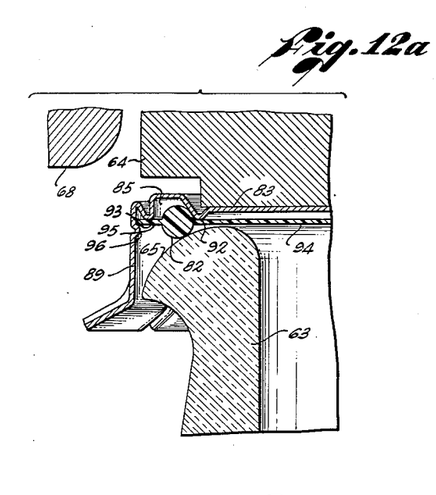
FIGURES 12a, 12b, 12c, and 12d are fragmentary sections showing successive stages of the operation of applying the cap and element of FIGURE 11 to a bottle.
Figure 12B:
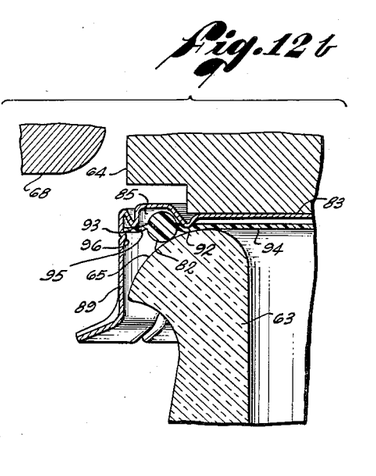

The first stage in the capping operation is shown in FIGURES 12a and 12b where it may be seen that the cap 81 is in place over the lip 65 of the bottle 63, and that the pressure foot 64 is in its position of engagement with the central portion 83 of the cap. Descension of the pressure foot 64 to the position of FIGURE 12b causes the inner annular pressure ridge 92 to urge a limited area of the liner disc 94 into abutment with the bottle lip 65. Direct contact of the pressure ridge 92 and the lip 65 is, of course, prevented by the disc 94. However, since the disc 94 is deformable and relatively thin, a high unit pressure is applied. Experience has shown that this pressure is sufficiently high to prevent plastic flow or extrusion of the sealing member-liner element 80 between the opposed surfaces of the ridge 92 and the bottle lip 65.

Figure 12C:
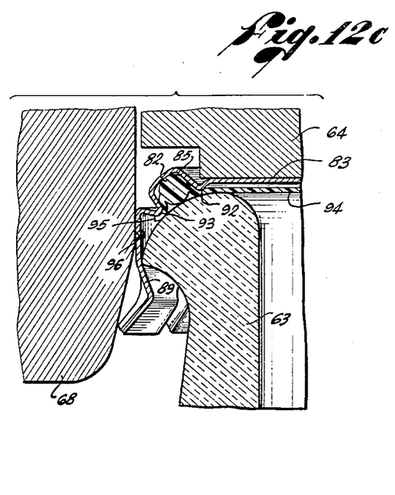

The second stage of the capping operation is illustrated in FIGURE 12c. During this stage the crown block 68 descends and engages the cap skirt 89 causing the portion of the cap outwardly of the inner pressure ridge 92 to pivot downwardly about that ridge as a fulcrum. Pivoting continues until the outer ridge 93 urges a limited area of the liner flange 96 into pressural contact with the bottle lip 65. As in the case of the inner ridge 92, the contacting area of the outer ridge 92 is relatively small so that a high unit pressure is applied, this pressure being sufficiently high to preclude extrusion of the element 80 between the opposing surfaces of the ridge and the lip 65. This construction therefore overcomes the tendency of some plastics to cold flow when subjected to a deforming pressure.

Figure 12D:
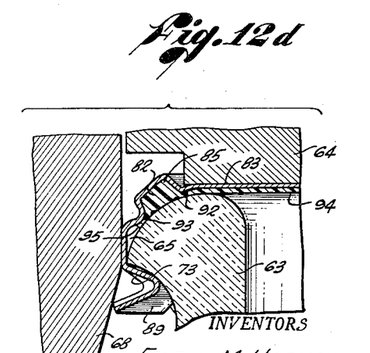

FIGURE 12d shows the various elements at the completion of the capping operation, the crown block 68 having further descended so as to crimp the skirt 89 of the cap 81 under the lip 65 and against the annular shoulder 73 to lock the cap on the bottle and maintain sealing pressure. This final stage of the capping operation is identical to that described in connection with the previous embodiment with respect to the achieving of the optimum void-volume relationship. As the outer ridge 93 is pulled slidably down on the lip 65, the volume of the groove 85 is reduced and the sealing ring 82 is deformed against the bottle lip 65. This reduction of groove volume and sealing ring deformation continue until the void space is completely filled by the deformed ring 82, i.e., an equal void-volume relationship is established. When this relationship is established, the crown block 68 wipes or slides over the skirt 89 to crimp it inwardly against the shoulder 73.

It will readily be appreciated that deviations from standard of the volume of the groove 85 or the sealing ring 82 are compensated during the capping operation. The extent of flange 89 pulled down over the lip 65 and crimped against the shoulder 73 varies in accordance with the deviation in the manner discussed in connection with the previous embodiment.

Thus, this embodiment has the advantage of the previous one in that groove-sizing and capping are combined in a single operation and also has the further advantage of providing a noncorrosive cap liner integral with the sealing ring.

Another use for the integral sealing member-liner element 80 is illustrated in FIGURES 13 through 16 and described below. The element 80 is here used in connection with a screw-type cap 100 to provide a relatively low-pressure seal for a standard jar 101 or the like.

A requirement for sealing closures of this type is that effective low pressure sealing be provided, yet that the cap have relatively low installation and removal torques so that it is suited for hand removal and reinstallation.

Figure 13:
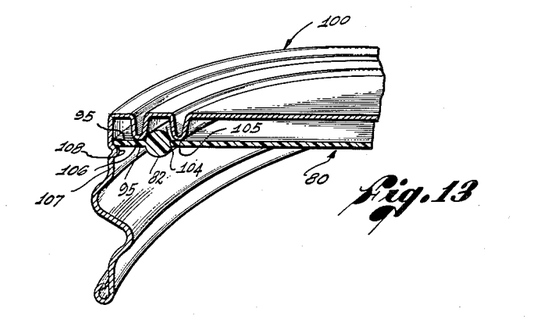
FIGURE 13 is a fragmentary perspective view of the screw-type jar cap fitted with the integral sealing member-liner element shown in FIGURE 11.

As shown in FIGURE 13, the cap 100 has a peripheral seal-receiving groove 104 bounded on its opposite sides by concentric inner and outer pressure ridges 105 and 106. The depth of the groove 104 is less than that of the sealing ring 82 for reasons that will become apparent. In order that an optimum void-volume relationship may be established, the volume of the groove 104 is preferably equal or just slightly greater than that of the sealing ring 82.

In order to retain the sealing member-liner element 80 in assembly with the cap 100, the outer flange portion 107 of the cap is formed with a detent means including a plurality of angularly spaced and inwardly projecting dimples or detents 108 as shown, or an annular ring. In assembling the cap 100 and the element 80, the liner flange 95 is merely sprung over the detents 108, whereupon the element 80 is retained between the opposing surface of the outer pressure ridge 106 and the detents 108.

Figure 14A:
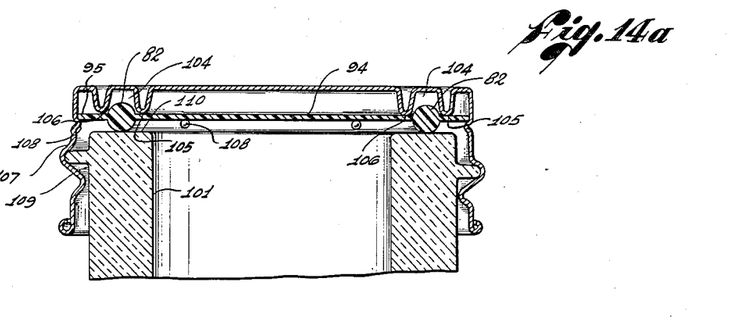
FIGURES 14a and 14b are fragmentary sections showing successive stages of the operation of applying the cap and integral sealing member-liner element of FIGURE 13 on a jar.

The capping operation in this case is by hand. In the first step, illustrated in FIGURE 14a, the cap 100, carrying element 80, is placed over the externally threaded mouth 109 of the jar 101. It will be noted that in this position the circumference of the sealing ring 82 is tangent to the lip 110 of the jar and only the upper sector of the sealing member 82 extends into the groove 104. As the cap 100 is screwed down over the jar mouth 109 the sealing ring 82 is deformed between the lip 110 and the bottom of the groove to effect sealing.

Figure 14B:
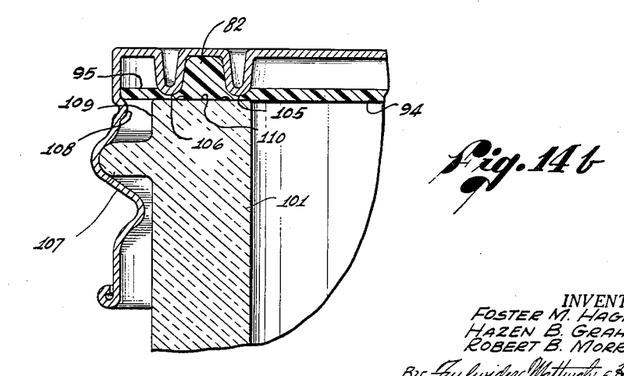

The cap 100 and the element 80 are shown on the jar 101 at the completion of the capping operation in FIGURE 14b. It will be seen that the ridges 105 and 106 simultaneously urge a limited area of the element 80 into pressural engagement with the lip 110. Even with only hand tightening of the cap 100, the surface area of the ridges 105 and 106 is sufficiently small whereby some sealing is normally effected between these ridges and the jar lip 110. However, primary sealing is obtained by virtue of the sealing ring deformation as previously explained.

In accomplishing sealing, the ring 82 is adapted to accommodate out-of-flat deviations of the jar lip 110 or the cap 100. Since the groove 104 is shallower than the cross-sectional diameter of the sealing ring, out-of-flat variations merely result in variations in the area of contact of the ring 82 and the lip, and also in variations in the proportion of the sealing ring deformed into the groove 104. For example, if a portion of the jar lip 110 is out of flat on the low side, the proportion of the sealing ring 82 deformed into the groove 104 and the area of contact in that region will both be somewhat reduced. Of course, if the jar lip 110 is out of flat on the high side, the reverse will be true.

In this embodiment the sealing pressures required are such that the groove 104 need not be exactly sized to the sealing ring 82. Further, it is not necessary in manufacture to hold size or shape of the groove 104 or ring 82 within a close tolerance range, as frequently the groove will not be completely filled by the ring because of the above discussed out-of-flat variations or because of the of the low torque applied in hand-tightening the cap 100. However, in order to gain the advantages of an equal void-volume relationship, should the sealing ring 82 be completely deformed into the groove 104, the volume of the groove, as previously explained, is preferably equal or just slightly greater than that of the ring.

Thus, in this embodiment there is provided an inexpensive, yet efficient low pressure seal and liner for a jar or the like which will accommodate out-of-flat variations in the cap or jar lip and still provide an effective seal.

While particular exemplary preferred embodiments of the invention have been described in detail above, it will be understood that modifications and variations therein may be effected without departing from the true spirit and scope of the novel concepts of the present invention, as defined by the following claims.

We claim:

1. A sealing device for an open-mouthed container having a sealing lip adjacent its mouth comprising: a sheet metal cap having downwardly facing concentric inner and outer pressure ridges on opposite sides of an upwardly extending groove and adapted to engage said lip, and a downwardly flared skirt outwardly of said outer pressure ridge; detent means around the inner periphery of said skirt, said detent means being spaced downwardly a small distance from the lower extents of said pressure ridges; an integral sealing-lining element including a resilient, deformable sealing ring positioned entirely within said groove, a liner disc closing the central space of said sealing ring and engaging said inner pressure ridge, and a peripheral liner flange extending outwardly from said sealing ring and having an outside diameter substantially equal to the inside diameter of said skirt in the region of said detent means, said liner disc and liner flange initially positioning said ring with at least a portion thereof projecting from said groove, and said liner flange being engageable between said detent means and said outer pressure ridge, whereby said element is maintained in assembly with said cap.

2. A sealing device for a crown-type bottle having an overhanging lip presenting an annular shoulder facing oppositely from the top of said lip, comprising: a cap formed of a ductile material and having a flat central lid portion, a peripheral groove portion defining a seal-receiving groove, inner and outer pressure ridges on opposite sides of said groove, and a depending skirt adapted for locking engagement with said shoulder, said inner ridge being initially adapted for pressural engagement with said lip, and said outer ridge being adapted for movement downwardly about said inner ridge as a fulcrum into pressural engagement with said lip and, thereafter, for movement slidably along said lip during the locking engagement of said skirt with said shoulder to reduce the volume of said groove; and a resilient, deformable sealing element having a sealing ring with a volume initially less than that of said groove disposed in said groove, said ring being confined entirely within said groove and against said lip to seal said bottle during the locking engagement of said skirt with said shoulder.

3. A sealing device for a crown-type bottle having an overhanging lip presenting an annular shoulder facing oppositely from the top of said lip comprising: a cap formed of a ductile material and having a flat central portion, a peripheral raised groove portion defining an annular groove having a radial width at its mouth which is less than the radial width of said lip; concentric inner and outer pressure ridges bounding the opening to said groove and adapted for pressural engagement with said lip, and a depending skirt extending from said outer ridge and adapted for locking engagement with said shoulder; and a resilient, deformable and substantially incompressible sealing ring disposed in said groove and adapted to be deformed against said lip, said ring having a volume initially less than that of said groove, said outer ridge being adapted to move downwardly over said lip coincidental with the locking engagement of said skirt with said shoulder to reduce the volume of said groove until it is substantially equal to that of said ring.

4. A sealing device for a crown-type bottle having an overhanging lip adjacent its opening presenting an annular shoulder facing oppositely from the top of said lip, comprising: an integral cap formed of a ductile material and having, in series, a flat central lid portion, a continuous inner pressure ridge initially located in a plane spaced a small distance below the plane of said lid portion and adapted for pressural engagement with said lip, a raised groove portion defining a continuous groove, a continuous outer pressure ridge initially spaced above said lip when said inner ridge is in pressural engagement with said lip, and a depending skirt adapted for locking engagement with said shoulder; and an element including a resilient, deformable sealing ring with a volume initially less than that of said groove positioned within said groove, said ring having a lower portion with a normally arcuate periphery adapted to be deformed into sealing engagement with said lip, said outer ridge being adapted for pivotal movement downwardly about said inner ridge as a fulcrum into pressural engagement with said lip to confine said ring within said groove and, thereafter, for slidable movement along said lip, coincidentally with the locking engagement of said skirt with said shoulder, to reduce the volume of said groove until it is substantially equal to that of said ring.

5. A sealing device for a crown type bottle having a curved and overhanging lip adjacent its mouth and formed with an annular shoulder facing oppositely from the top of said lip, comprising:

a thin sheet metal cap adapted to be positioned over said lip and including a central lid portion with a diameter approximately equal to the maximum outside diameter of said lip and a depending skirt portion adapted for locking engagement with said shoulder, said lid portion having annular inner and outer pressure ridges projecting downwardly therefrom and defining the boundaries of a groove in the interior of the cap, said ridges being in registry with said lip; and an integral sealing-lining element formed of a resilient, deformable plastic material resiliently carried by said cap in the interior thereof and positioned adjacent said lid portion, said element having an annular ring with a lower lip-engaging sector of arcuate peripheral shape which is initially disposed in registry with said groove and at slight spacing therefrom, a central liner disc extending inwardly from the periphery of said ring, and a peripheral liner flange extending outwardly from the periphery of said ring, the disc and flange being located substantially in a common plane which normally lies above said lower sector, said inner ridge being adapted when said cap is positioned over said lip to urge a first limited area of said disc into pressural contact with said lip, and said outer ridge being adapted for pivoting downwardly relative to said lip about said inner ridge as a fulcrum to urge a limited area of said liner flange into pressural contact with said lip and, thereafter, said outer ridge being adapted for sliding movement relative to said lip to volumetrically size said groove to said ring until the volume thereof is substantially equal to the volume of said ring, said ridges cooperating during locking engagement of said skirt portion with said shoulder to deform said sector against said lip and confine said ring in a deformed condition within said groove.

6. A sealing device for an open mouthed container having a sealing lip adjacent its mouth, comprising:

a cap formed of a thin sheet metal and having a central lid portion with a pair of spaced apart continuous, downwardly facing pressure ridges adjacent its periphery defining the boundaries of a continuous groove, the groove having a width at its mouth which is less than the width of said lip, and a skirt portion depending from said lip portion;

means on said skirt portion and said container for removably securing said cap on said container;

and an element positioned within said cap in non-adhered relationship adjacent said lid portion and including a sealing ring formed of a resilient, deformable material, said ring being initially disposed with a substantial portion thereof out of said groove and adapted to be received therein, said ridges pressurally engaging said lip when said means secure said cap to said container so as to deform said ring against said lip and confine it within said groove, the volume of said ring being substantially equal to, but no greater than that of said groove during such confinement.

7. A sealing device for an open mouthed container having a sealing lip adjacent its mouth, comprising:

a cap formed of a ductile metal and having a central lid portion with a pair of concentric, downwardly facing annular pressure ridges adjacent its periphery in registry with said lip and defining the boundaries of an annular groove, the side walls of said groove tapering inwardly toward one another from the opening toward the bottom thereof, and a skirt portion depending from said lid portion and adapted for locking engagement with said container;

and an integral sealing-lining element positioned within said cap and including an annular ring of circular cross section with a diameter greater than the minimum width of said groove, a flat liner disc extending inwardly from the periphery of said ring and a flat peripheral liner flange extending outwardly from the periphery of said ring in generally coplanar relationship with said disc, the element being positioned with said ring in registry with said groove and with a major portion thereof initially disposed out of said groove, said ridges being adapted to pressurally engage said lip during locking relationship of said skirt portion with said container to deform said ring against said lip and confine it in a deformed state within said groove.

8. The subject matter of claim 7 further characterized in that the volume of said ring is substantially equal to that of said groove.

9. A sealing device for an open mouthed container having a sealing lip adjacent its mouth, comprising:

a cap formed of a thin ductile metal and having a central lid portion with inner and outer continuous, downwardly facing pressure ridges adjacent its periphery defining the boundaries of a continuous groove in the interior of said cap, the groove having a width at its mouth which is less than the width of said lip, and a skirt portion depending from said lid portion and adapted for locking engagement with said container;

and an element positioned within said cap and including a continuous sealing ring having a volume substantially equal to that of the groove and, in cross section, a lower lip-engaging sector normally of arcuate peripheral shape, a liner disc extending inwardly from the periphery of said ring, and a peripheral liner flange extending outwardly from the periphery of said ring in a plane lying above said lip-engaging sector and in generally coplanar relationship with said liner disc, said element being positioned initially with the upper surface of said liner disc and liner flange contacting said inner and outer ridges, respectively, and with said lip-engaging sector of said ring in registry with and disposed out of said groove, and said ridges being adapted to pressurally engage said lip during locking relationship of said skirt portion with said container to deform said ring against said lip and confine it in a deformed state within said groove.

References Cited in the file of this patent

UNITED STATES PATENTS

| | | |
|---|---|---|
| 1,054,308 | Nissinen | Feb. 25, 1913 |
| 1,956,214 | Booth | Apr. 24, 1934 |
| 2,078,132 | Fergusson | Apr. 20, 1937 |
| 2,327,454 | Punte | Aug. 24, 1943 |
| 2,786,593 | Nofer | Mar. 26, 1957 |

FOREIGN PATENTS

| | | |
|---|---|---|
| 484,741 | Italy | Sept. 18, 1953 |